United States Patent Office.

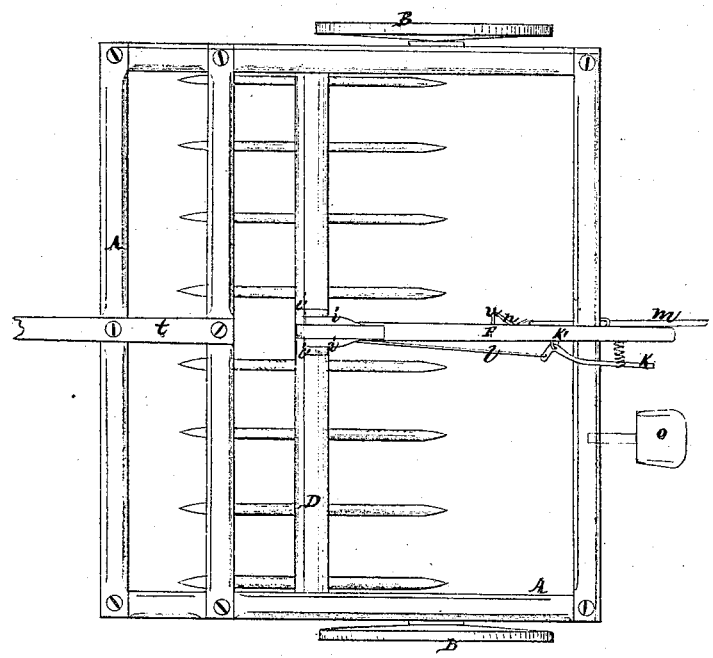

JOHN H. MORRIS, OF MAQUOKETA, IOWA.

Letters Patent No. 101,646, dated April 5, 1870.

IMPROVEMENT IN HORSE HAY-RAKES.

The Schedule referred to in these Letters Patent and making part of the same.

I, JOHN H. MORRIS, of Maquoketa, in the county of Jackson and State of Iowa, have invented certain Improvements in a Revolving Sulky-Rake, of which the following is a specification.

The nature of this invention relates to certain improvements in the construction of a revolving sulky-rake, making a very simple, durable, and cheap machine.

Figure 1 is a plan view.
Figure 2 is a cross-section.

In the drawing—

A represents a frame of suitable dimensions, to which are attached the various parts of the machine.

The frame A is supported upon two wheels, B B, whose bearings are in the form of brackets $b\ b$, secured to the sides of the frame, and without having an axle across the frame, thus leaving the space between the wheels open and entirely unobstructed.

The brackets are arranged so as to be shifted back or forward on the frame, and so adjusted by bolts and a series of corresponding holes in the sides of the frame, or by any other convenient method, as that the machine may be securely balanced conveniently to the weight of the person sitting in the seat.

To the forward rail of the frame A, at the corners, are hung by a joint two arms, $c\ c$, which reach down to the ground at about an angle of forty-five degrees.

To the lower ends of the arms $c\ c$ is pivoted the axle D of the rake.

At the center of the axle of the rake is attached a lever, E, by a joint which is constructed so as to permit the rake to revolve, there being a band, $e$, passing round the axle D, and fastened to the lever E.

There are also attached to the lever E two small springs, $i\ i$, which catch against small lugs or projections $i'\ i'$ on the axle D.

To the side of the lever D is attached a small dog, $j$, which also catches against lugs on the axle.

This and the springs are to prevent the rake turning, except when desired, as hereinafter shown.

Upon the side of the lever is attached a small lever, K, pivoted at K'.

To the small arm of the lever K is attached a connecting-rod, $l$, connecting it with the dog $j$. This is for releasing the dog when desired.

To the rear side of the frame A is attached a lever, $m$, by a joint, to the lower end of which is attached a chain, $n$, said chain being also attached to the under side of the lever E.

This is for raising the rake from the ground, by depressed the upper end of the lever $m$, carrying it over in the position seen in dotted lines, there being a ratchet on the side of the lever E which holds it in that position, and drawing up on the lever E, as seen in dotted lines also.

A seat, $o$, is provided for a driver upon the rear of the frame, and near the levers E, K, and $m$, convenient for him to handle.

A pole, $t$, or a pair of thills may be attached to the front of the frame A, for attaching a team of one or two horses.

The operation of this machine is as follows:

The driver, when arrived on the ground, releases the lever $m$ from the ratchet $n$, and lets the rake down to the ground, when, by slightly raising the lever E, he dips the forward points of the rake, and when he has gone a sufficient distance releases the hold of the dog $j$ by depressing the upper end of the lever K, when the rake will be turned half over, and depositing its load; the dog again catching, the operation is repeated.

The driver's seat is placed upon the rear of the frame, and adjusted to and balanced with the weight of the driver, by moving the wheels back and forth on the sides of the frame, as hereinbefore set forth, for the purpose of greater convenience and efficiency in the operation of the machine.

The animals are relieved from the weight, and by this position the driver can see and maintain complete control over all parts of the machine, without wthdrawing his attention from any part thereof, or from the animals he is driving, or the conformity of the ground, or of any obstructions that may be in his way. All are before him, and the levers necessary for shifting or changing the operation or position of the machine being immediately at his hand, can be worked without distracting his attention from what is before him.

I claim as my improvement—

The arrangement of frame A, wheels B, brackets $b$, seat $o$, arms $c\ c$, and handle E, with lever K, rod $l$, springs $i\ i$, lugs $i'$, dog $j$, lever $m$, and chain $n$, the whole combined to operate substantially as and for the purpose specified.

JOHN H. MORRIS.

Witnesses:
GEO. W. TIBBITTS,
GEO. HESTER.